US007747536B2

(12) United States Patent
McGee et al.

(10) Patent No.: US 7,747,536 B2
(45) Date of Patent: Jun. 29, 2010

(54) ANTI-FRAUD PRESENTATION INSTRUMENTS, SYSTEMS AND METHODS

(75) Inventors: Christopher McGee, Parker, CO (US);
Keith Newbrough, Parker, CO (US);
Kevin Harte, Denver, CO (US);
Kenneth E. Jennings, Jr., Davie, FL (US)

(73) Assignee: First Data Corporation, Englewood, CO (US)

( * ) Notice: Subject to any disclaimer, the term of this patent is extended or adjusted under 35 U.S.C. 154(b) by 177 days.

(21) Appl. No.: 11/382,882

(22) Filed: May 11, 2006

(65) Prior Publication Data

US 2007/0198433 A1 Aug. 23, 2007

Related U.S. Application Data

(60) Provisional application No. 60/680,383, filed on May 11, 2005.

(51) Int. Cl.
*G06Q 99/00* (2006.01)
(52) U.S. Cl. .............................. 705/65; 705/64; 705/67; 705/40; 705/44; 705/78; 713/150
(58) Field of Classification Search ............. 705/64–79, 705/40–44; 713/150
See application file for complete search history.

(56) References Cited

U.S. PATENT DOCUMENTS 6,857,566 B2 2/2005 Wankmueller

| 2005/0060233 | A1 | 3/2005 | Bonalle et al. |
| 2005/0080677 | A1* | 4/2005 | Foss, Jr. ....................... 705/16 |
| 2006/0249569 | A1* | 11/2006 | Jain ........................... 235/380 |
| 2007/0118478 | A1* | 5/2007 | Graves et al. ................. 705/44 |

OTHER PUBLICATIONS

"Octopus card", www.answers.com.*

* cited by examiner

*Primary Examiner*—Jalatee Worjloh
(74) *Attorney, Agent, or Firm*—Townsend and Townsend and Crew LLP

(57) ABSTRACT

The invention provides improved security for stored-value instruments. For example, a point-of-sale device may receive a request to process a transaction (such as an activation, redemption, funds recharge, etc.) with a presentation instrument. The point-of-sale device may receive a first identifier associated with the instrument. Merely by way of example, the first identifier may be encoded on a magnetic stripe disposed on the instrument, and receiving the first identifier may comprise swiping the magnetic stripe through a reader in communication with the point-of-sale device. The point-of-sale device may also receive a second identifier associated with the instrument. In some embodiments, the first and second identifiers may be correlated, e.g., to determine whether they are consistent. Merely by way of example, the second identifier may be derived from the first identifier in a specified manner, and the correlation of the first and second identifiers may comprise determining that the second identifier comprises the properly derived information. If the first and second identifiers are successfully correlated, the transaction may be performed.

26 Claims, 4 Drawing Sheets

ANTI-FRAUD PRESENTATION INSTRUMENTS, SYSTEMS AND METHODS

CROSS-REFERENCES TO RELATED APPLICATIONS

This application claims the benefit of the filing date of provisional U.S. Patent Application No. 60/680,383, filed by McGee et al. on May 11, 2005 and entitled "Anti-Fraud Presentation Instruments, Systems and Methods," the complete disclosure of which is incorporated herein by reference.

BACKGROUND OF THE INVENTION

This application relates generally to stored-value instruments. More specifically, this application relates to methods and systems for processing stored-value instruments.

In recent years, stored-value cards have become increasingly popular among consumers. The steadily increasing demand for such cards, in the form of prepaid gift cards and other types of stored-value cards, has resulted in an increased number of merchants offering stored-value cards for sale. This success in marketing stored-value cards has, however, spawned a variety of fraudulent practices related to these cards.

There is, accordingly, a general need in the art for methods and systems to provide more security for stored-value instruments.

BRIEF SUMMARY OF THE INVENTION

The invention provides improved security for stored-value instruments. For example, a point-of-sale device may receive a request to process a transaction (such as an activation, redemption, fund reload, etc.) with a presentation instrument. The point-of-sale device may receive a first identifier associated with the instrument. Merely by way of example, the first identifier may be encoded on a magnetic stripe disposed on the instrument, and receiving the first identifier may comprise swiping the magnetic stripe through a reader in communication with the point-of-sale device. The point-of-sale device may also receive a second identifier associated with the instrument. In some embodiments, the first and second identifiers may be correlated, e.g., to determine whether they are consistent. Merely by way of example, the second identifier may be derived from the first identifier in a specified manner, and the correlation of the first and second identifiers may comprise determining that the second identifier comprises the properly derived information. If the first and second identifiers are successfully correlated, the transaction may be performed.

Various embodiments of the invention, then, provide methods, systems and/or software for processing stored-value instruments. A set of embodiments, for example provides methods for processing stored-value instruments. An exemplary method may comprise receiving, e.g., at a point-of-sale device (which might be a cash register, point-of-sale terminal, etc.) an identifier identifying a stored-value instrument. In a particular embodiment, to cited but one example, the instrument may comprise a magnetic stripe and/or receiving the identifier may comprise a clerk (and/or another) swiping the magnetic stripe through a magnetic stripe reader (which may be incorporated in and/or in communication with the point-of-sale device). The method may further comprise receiving (again, perhaps at the point-of-sale device) a second identifier, which may be associated with the stored-value instrument. In some cases a request to perform a transaction involving the stored-value instrument may be transmitted (e.g., from the point-of-sale device). Merely by way of example, a transaction involving a stored-value instrument may be a purchase of a stored-value instrument, a redemption using the stored-value instrument (e.g., using the stored-value instrument to purchase merchandise), a reload transaction (e.g., placing additional funds in an account associated with the instrument), etc. The first identifier may be correlated with the second identifier, and/or, perhaps based on a correlation between the first identifier and the second identifier, the transaction may be processed. Optionally, a confirmation of the correlation and/or of the transaction may be transmitted and/or may be provided to the customer.

In some cases, a point-of-sale device may correlate the first identifier with the second identifier. In other cases, the first and/or second identifier(s) may be transmitted to, and/or received by, a host system and/or an instrument-authority system (both of which, in particular embodiments, may be embodied by the same system), and/or such system(s) may be used correlate the first identifier with the second identifier. Likewise, in other embodiments, such system(s) may be used to process the transaction.

A variety of storage devices, which may be incorporated in and/or disposed on the stored-value instrument, may be used to store the first and/or second identifier(s). Merely by way of example, such storage devices can include, inter alia, a magnetic stripe, a radio-frequency identification ("RFID") tag, a memory chip and/or a printed number. In a particular embodiment, the first identifier and the second identifier may be the same identifier. In other embodiments, the second identifier may be derived from some or all of the first identifier, and/or the first and/or second identifiers may be encrypted. Merely by way of example, in a set of embodiments, a model identifier may be derived from the first identifier (e.g., using a particular procedure), and/or the model identifier may be compared with the second identifier.

In another embodiment, the first and/or second identifiers may be stored in a database (e.g., at a host system point-of-sale device and/or instrument-authority system). In this embodiment, correlating the first identifier with the second identifier may comprise searching the database for a record associated with the first identifier and/or obtaining from the record a model identifier. This model identifier may then be compared with the second identifier. As such, depending on the embodiment, the second identifier may not be derived from the first identifier.

Another exemplary method comprises receiving at a point-of-sale device a first identifier, which again may identify a stored-value instrument. The stored-value instrument may comprise a magnetic stripe and/or the first identifier may be stored on a magnetic stripe. The exemplary method may further comprise receiving (e.g., at the point-of-sale device) a second identifier, which may be associated with the stored-value instrument. The second identifier may stored on a storage device (including without limitation those described above) other than the magnetic stripe and/or may be derived from at least a portion of the first identifier using a particular procedure.

The method may further comprise transmitting (e.g., from the point-of-sale device) a request to process a transaction involving the stored-value instrument, receiving (e.g., at an instrument-authority system and/or a host system) the request to process the transaction involving the stored-value instrument and/or deriving a model identifier from the first identifier using the particular procedure. The second identifier may be compared with the model identifier to determine whether the second identifier correlates with the first identifier. Perhaps based on a correlation between the first identifier and the second identifier, the transaction may be processed.

Another set of embodiments provides systems for processing stored-value instruments, including without limitation systems configured to perform methods of the invention. An exemplary system comprises a point-of-sale device and an instrument-authority system. The point-of-sale device may be configured to receive a first identifier identifying a stored-value instrument, to receive a second identifier associated with the stored-value instrument, and/or to transmit a request a request to process a transaction involving the stored-value instrument.

The instrument-authority system, which may be in communication with the point-of-sale device, may comprise a communications system, a processor in communication with the communications system, and/or a memory coupled with the processor. The memory may comprise a computer-readable storage medium having a computer-readable program embodied therein for directing operation of the instrument-authority system. The computer-readable program may comprise instructions for receiving the first identifier from the point-of-sale device and/or instructions for receiving the second identifier from the point-of-sale device. The computer readable-program may comprise further instructions for correlating the first identifier with the second identifier and/or for processing the transaction.

In some cases, the point-of-sale device may be configured to correlate the first identifier with the second identifier and/or to transmit a confirmation that the first identifier correlates with the second identifier. (In such cases, the instrument-authority system may not need to correlate the first identifier with the second identifier.) In a particular set of embodiments, the request to process a transaction may serve as the confirmation that the first identifier correlates with the second identifier.

Another exemplary system may comprise a communications system, a processor in communication with the communications system, and/or a memory coupled with the processor. The memory may comprise a computer-readable storage medium having a computer-readable program embodied therein for directing operation of the system. The computer-readable program may include instructions for receiving a request (e.g., from a point-of-sale device) to process a transaction involving a stored-value instrument. The stored-value instrument may comprise a first storage device for storing a first identifier and/or a second storage device for storing a second identifier. (Such storage devices may comprise, inter alia, the storage devices described elsewhere herein.) The program may further comprise instructions for receiving a first identifier (which may be stored on the first storage device), which may identify the stored-value instrument, instructions for receiving a second identifier (which may be stored on the second storage device and/or which may be associated with the stored-value instrument), and/or instructions for correlating the first identifier with the second identifier. Based, perhaps, on a correlation of the first identifier with the second identifier, the transaction may be processed. Optionally, there may be instructions for providing a confirmation that the transaction has been processed.

Yet another set of embodiments provides software programs, including without limitation programs comprising instructions for implementing methods of the invention. An exemplary program, which may be embodied on at least one computer readable medium, may comprise instructions executable by one or more computers to receive a request (e.g., from a point-of-sale device) to process a transaction involving a stored-value instrument, to receive a first identifier (which might identify the stored-value instrument, to receive a second identifier (which may be associated with the stored-value instrument) and/or to correlate the first identifier with the second identifier. Based, perhaps, on the correlation of the first identifier with the second identifier, the instructions may be further executable to process the transaction and/or, optionally, provide a confirmation that the transaction has been processed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention permit retailers to continue to use traditional methods of displaying and selling stored-value presentation instruments, while providing enhanced security to prevent unauthorized and/or fraudulent use of unpurchased cards. A stored-value presentation instrument can be any instrument (tangible or intangible) that may be associated with a debit account and/or may otherwise be presented for payment for goods and/or services, used to transfer money, etc. Particular embodiments of stored-value instruments comprise stored-value cards, which may have a form factor similar to that of credit cards, etc. In a set of embodiments, stored-value instruments, such as cards may be packaged in a manner described in detail in U.S. patent application Ser. No. 10/665,984, filed Sep. 19, 2003 by McGee et al. and entitled "Financial Presentation Instruments with Integrated Holder and Methods for Use," the entire disclosure of which is incorporated herein by reference.

In many cases, a stored-value instrument may comprise some form of identifier, which may be sufficient to uniquely identify the stored-value instrument. Merely by way of example, an instrument may comprise a magnetic stripe and/or a bar code. The identifier, which might be a serial number and/or other string of text and/or numbers, then, might be encoded onto the magnetic stripe and/or represented by the bar code. (As noted below, a variety of storage devices may be used to store and/or represent the identifier.) Those skilled in the art will appreciate the variety of methods that can be used to encode/decode a magnetic stripe, translate a bar code and/or store an identifier on any appropriate storage device.

In some cases, the stored-value instrument may comprise both a magnetic stripe and a bar code (or, for that matter, any two storage devices). The magnetic stripe may be used to store an identifier (such as an account number associated with the instrument and/or the like), which may also be printed, embossed, etc. on the instrument. The bar code may represent a second identifier, which may (but, in some cases, need not) have some relation to the identifier. Merely by way of example, in some cases, the bar code may be a Code128 bar code known in the art. The bar code may represent a 19-digit string (and/or a string of any other appropriate length, including merely by way of example, 12-digit strings, 13-digit strings, 16-digit strings, 20-digit strings, 23-digit strings, as well as others). In an exemplary embodiment, the string might have a format of SCUUUUUUUUUUUEEEEM, where SC represents a two-digit term identifying the instrument as a stored-value instrument, UUUUUUUUUUUU represents a twelve-digit UPC code (which may be used to identify a product run of the stored-value instruments, etc.), EEEE represents an encrypted value derived from the identifier stored on the magnetic stripe and/or printed/embossed on the instrument, and the M represents a check digit, which might be derived from the UPC and/or the encrypted value.

(Of course, while this exemplary format may be used in a set of embodiments, those skilled in the art will appreciate that a variety of procedures may be used to create and/or format the string represented by the bar code. Merely by way of example, in some cases, the bar code may not contain a UPC code. In other cases, the second identifier may not be derived from the first identifier; as one alternative option, the second identifier—which may be represented by the bar code—may be a value independent of the first identifier, and/or the two identifiers may be associated in a database, as described elsewhere herein.)

In some embodiments, if a UPC code is represented by a portion of the bar code, the UPC code may be a standard code known in the art, such as a UPC-A code, in which the first digit of the code might identify the type of numbering system used, the next 5 digits of the code might identify the manufacturer and/or provider of the instrument, the following 5 digits might represent the product, and the last digit might be a checksum for the UPC code. The checksum for the UPC code might be, to cite bit one example, a modulo 10 checksum, and/or might be calculated in the following (and/or a similar) manner: (1) Sum the values of the digits in positions 1, 3, 5, 7, 9 and 11; (2) Multiply this result by 3; (3) Sum the values of the digits in positions 2, 4, 6, 8, and 10; (4) Sum the results of steps (2) and (3); and (5) Subtract this result from the next-highest multiple of 10 to obtain the checksum.

The encrypted value representing (and/or derived from) the first identifier (or a portion thereof) can be derived using any appropriate technique, of which many are known in the art. An exemplary technique may comprise 3DES encryption. In such a technique, a provider of the instrument (and/or another) may create three keys (referred to herein as K1, K2 and K3) and/or provide those keys to a retailer that will be selling the instruments. The technique may use cipher block chaining, perhaps with an initialization vector value of 0 (and/or any other appropriate value) and/or an encrypt-decrypt-encrypt ("EDE") mode. In other words, the instrument provider may create an identifier (which may be a 16 digit identifier, and/or an identifier of any other appropriate length), encrypt the identifier using K1, decrypt the result using K2 and encrypt this result using K3 to produce an encrypted byte stream derived from the identifier.

Next, the encrypted byte string may be encoded into an ASCII string, which might represent the hexadecimal values of each byte, thus producing an ASCII string of 32 characters (based on an assumed identifier length of 16 digits). Any alphabetic characters (i.e., A, B, D, D, E, or F) may be converted into digits (e.g., 1, 2, 3, 4, 5, or 6, respectively). Some or all of the resulting string may be used as part of the string represented by the bar code. For instance, in this example, the last four digits may be used as the portion represented above by the term "EEEE." The checksum for the bar code (the M digit) may be a modulo 10 checksum, computed in a manner similar to that described above, for example, of some or all of the other digits (e.g., the UUUUUUUUUUUUEEEE digits) in the bar code.

In other embodiments, different values may be used to create the bar code value. Merely by way of example, in some cases, the bar code value may incorporate a personal account number, a personal identification number, etc., which may be encrypted (perhaps in a manner similar to that described above).

A set of embodiments provides systems for processing stored-value instruments. An system in accordance with some embodiments may have components similar to those described in U.S. patent application Ser. No. 10/405,043, filed Sep. 26, 2003 by McGee et al. and entitled "Methods and Systems for Processing Unrestricted Stored-Value Instruments," the entire disclosure of which is incorporated herein by reference. Other structural systems may be used as well.

Figure 1A:
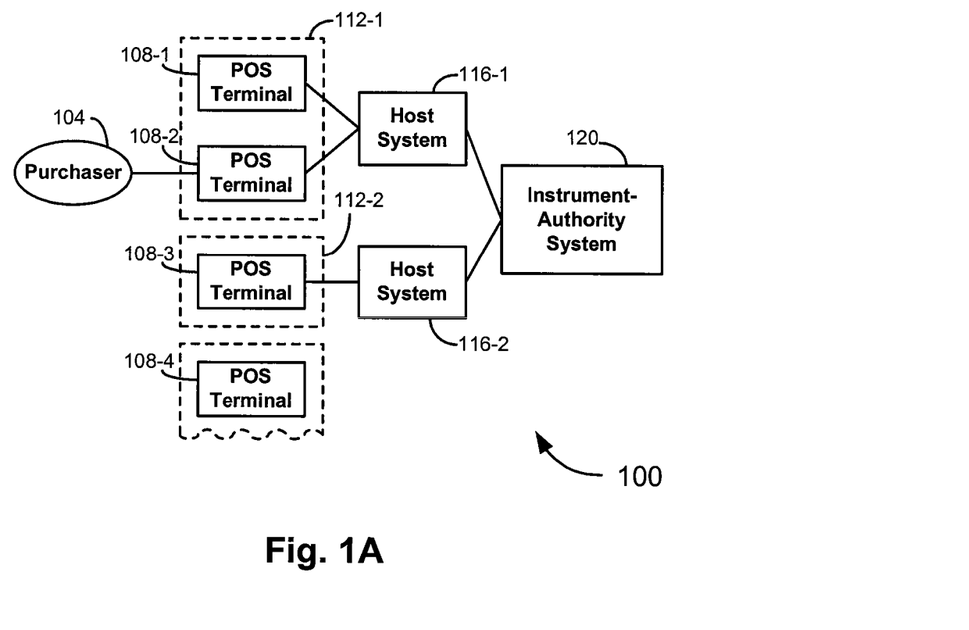
FIG. 1A provides a block diagram representation of a system arrangement used for implementing embodiments of the invention.

Merely by way of example, an overview of a structural system that may be used to implement methods of the invention is illustrated schematically in FIG. 1A. The stored-value instruments may be purchased, redeemed, reloaded, etc. by a customer 104 at a merchant location 112. Each merchant location 112 may include one or more point-of-sale terminals 108 having a capacity for reading information from the stored-value instrument, typically using hardware and/or software appropriate for the type of storage device(s) implemented by the instrument. Each point-of-sale terminal 108 may be configured for interacting with an instrument-authority system 120, perhaps through a host system 116 configured to interface directly with each of the point-of-sale terminals 108 at a particular merchant location 112. The instrument-authority system 120 may be adapted to manage the authentication and use of the stored-value instruments as described in further detail below. (In some embodiments, the host system 116 may be configured to perform the functions attributed herein to the instrument-authority system. In other embodiments, the host system 116 may be omitted and/or the instrument-authority system 120 may be configured to communicate directly with the point-of-sale terminals 108).

Figure 1B:
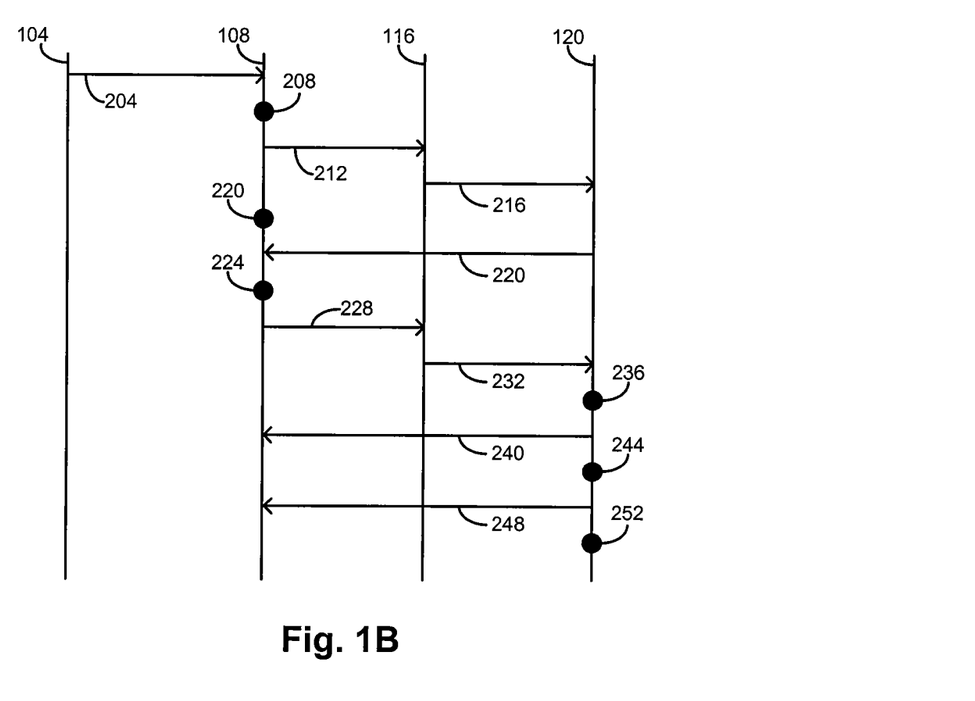
FIG. 1B provides a schematic illustration of a flow of information through the system of FIG. 1A according to embodiments of the invention.
Figure 2:
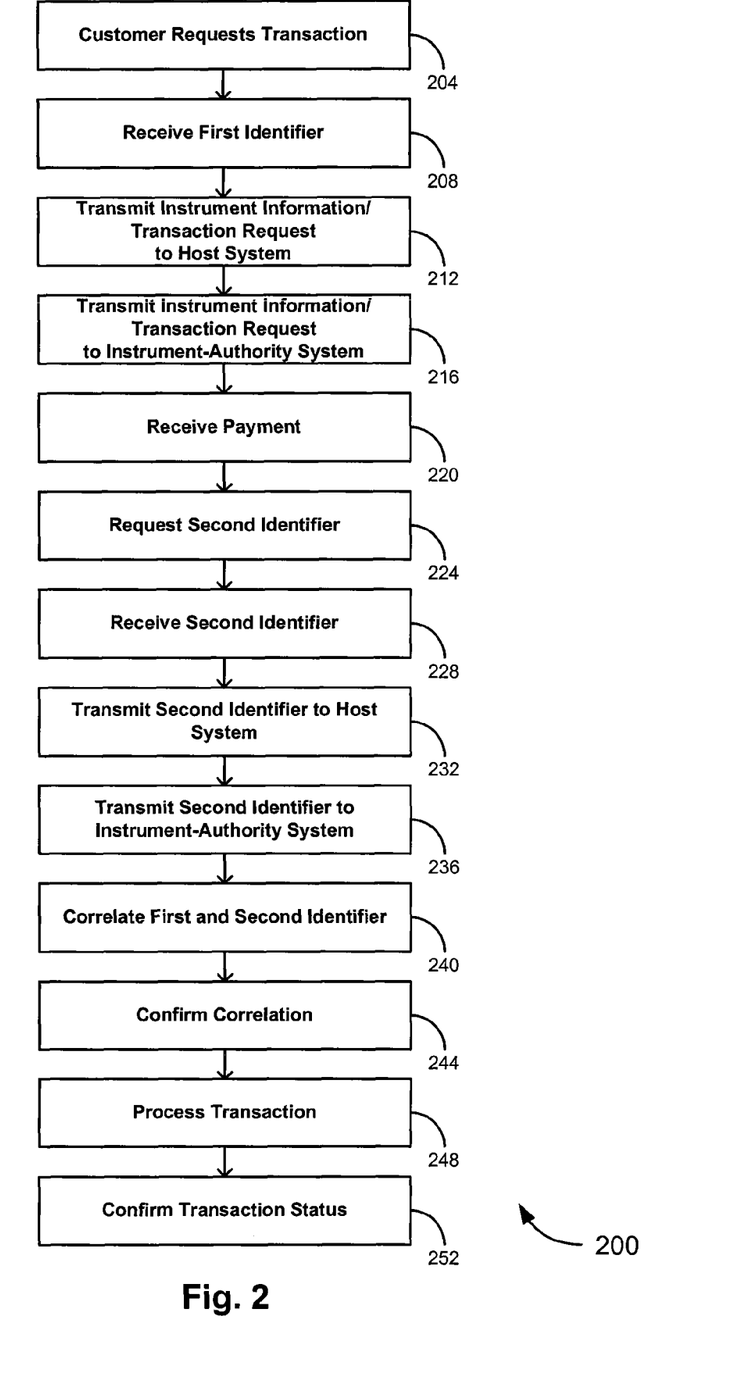
FIG. 2 is a flow diagram that summarizes methods of the invention in certain embodiments.

The manner in which the structural system illustrated in FIG. 1A may be used to implement embodiments of the invention is illustrated simultaneously with the schematic diagram of FIG. 1B and the flow diagram of FIG. 2, which illustrates an exemplary method 200 in accordance with some embodiments of the invention. While FIG. 2 uses blocks to indicate functions that may be performed in implementing methods of the invention in some embodiments, FIG. 1B uses arrows to illustrate a corresponding flow of information through the system in FIG. 1A as those functions are performed. Thus, at block 204, customer 104 may request a transaction (e.g., at a merchant location 112, etc.).

In some cases, the transaction may be the purchase of an instrument, such that the customer desires to purchase and/or activate a new presentation instrument. In such a case, the instrument may be chosen from a plurality of instruments at a merchant display, with different instruments being associated with different value amounts. In some instances, the instruments may not be associated with any particular value amount, and/or a value may be assigned to a particular instrument at the time of authentication and/or activation of the instrument, as described in more detail below. In other cases, the transaction may be a redemption transaction, such as, for example, when the customer wishes to use the instrument to purchase a good or service provided by the merchant location. Other possible transactions include reload and/or recharge transactions, where the customer typically wishes to add funds to an instrument (and/or an account associated therewith). As one skilled in the art can appreciate from these examples, a wide variety of transactions may be performed in accordance with embodiments of the invention. Of course, based on the disclosure herein, one skilled in the art will appreciate that multiple transactions may be performed in a single session Depending on the nature of the transaction to be processed 112, the clerk may be presented with the stored-value (presentation) instrument, perhaps with a payment, such as in the form of a credit card, debit card, cash, check, or the like (e.g., in instrument purchase and/or reload transactions), and/or with merchandise to be purchased (e.g., in redemption transactions). At block 208, the clerk (and/or the customer 104 or another) provides an instrument identifier for the instrument to a point-of-sale terminal 108, such as by swiping a card through a magnetic stripe reader so that a (perhaps encoded) identifier may be extracted from a magnetic strip affixed to the card. In alternative embodiments, other techniques may be used to obtain the identifier, including through optical scanning, bar-code scanning, and/or the like. In some embodiments, as described above, the identifier may be embossed and/or printed on the card, and/or providing the instrument identifier may comprise the clerk (and/or another) typing the identifier into a keypad associated with the point-of sale terminal. Hence, the point-of-sale terminal 108 receives the identifier. After receiving the identifier, the instrument information may be transmitted by the point-of-sale terminal 108 to a host system 116 at block 212, and perhaps transmitted from the host system 116 to the instrument-authority system 120 at block 216.

The instrument information may include the identifier and/or any other appropriate information. Further, the instrument information may comprise a request to process a transaction involving the instrument and/or may include the pertinent details of the transaction (e.g., merchant name, debit amount, etc.) as is known in the art. (In some cases, the transaction request may be transmitted separately from the instrument information.) In a particular set of embodiments (for example, in a reload transaction and/or in an instrument purchase transaction in which the instrument is not associated with any particular pre-determined value), the instrument information may include a value of the instrument, perhaps based on the purchase price of the instrument, and/or a reload value. In another set of embodiments (e.g., in a redemption transaction), the instrument information may include an amount to debit from the instrument (and/or an account associated therewith). (In yet another set of embodiments, the amount to be debited or credited to the instrument may be transmitted as a separate communication.) It can be seen, based on these examples, that the number of communications between a point-of sale terminal and a host and/or instrument authority system may vary depending on the embodiment, and/or that the type of information conveyed in each communication may vary depending on the embodiment.

At block 220, the clerk (and/or another) may receive payment, if the transaction is one in which payment should be received. Examples of such transactions might include instrument purchase and/or reload transactions, to name but two examples. (In some cases, payment may be received prior to transmitting the instrument information, while in other cases, a second identifier may be received, as discussed below, prior to transmitting any instrument information.) Payment may be tendered in any acceptable format, and/or using any of several known methods. Merely by way of example, the customer 104 may tender cash for the instrument. Alternatively and/or in addition, a credit and/or debit card payment may be processed, perhaps using the point-of-sale terminal 108. Other forms of payment, including checks, direct debit, etc. may be used as well. Those skilled in the art will appreciate that in many cases, items additional to a stored-value instrument may be purchased along with the instrument, and/or payment for some or all of the additional items may be tendered along with payment for the instrument, perhaps as part of a single transaction (cash payment, credit card authorization, etc.)

At block 224, the point-of-sale terminal, host system and/or instrument-authority system may request a second identifier (block 224), which can serve to provide verification that the first identifier is in fact the correct identifier for the instrument at issue. (Depending on the configuration of the system, any one or more of these devices may be responsible for ensuring that a second identifier is received and/or for correlating the first and second identifiers, as described in more detail below.) Hence, the terminal 108 may receive a second identifier (block 228). (It should be noted that, in some embodiments, no request for the second identifier is made; the second identifier may be received as a matter of course.)

The second identifier may comprise any information associated with the instrument (and/or more particularly, in some cases, stored on a storage device incorporated in and/or disposed on the instrument, such as a bar code, RFID tag, memory chip, etc.) In a particular set of embodiments, the storage device used to store the second identifier may be a different device that that used to store the first identifier. Merely by way of example, if a magnetic stripe is used to store the first identifier, a different device, such as a bar code, may be used to store the second identifier on the instrument. In this way, the device used to store the second identifier may be used to verify the validity of the information stored by the device used to store the first identifier, or vice-versa. Thus, if one of the devices has been corrupted (for example, if a magnetic stripe has been overwritten with a different identifier), the other device may be used to provide an indication of such. Those skilled in the are will appreciate that there are a number of ways known in the art to store information associated with a stored-value instrument, and any of them may be used as appropriate to store the first and/or second identifiers. Merely by way of example, in some embodiments, the first and/or second identifier may be stored in various ways (such as RFID chips, holograms, etc.) and/or any appropriate scanner, RFID reader and/or hardware may be used to obtain and/or input the first and/or second identifier.

As noted above, for example, the instrument may have associated a first identifier, which may be an embossed and/or printed string of characters and/or numbers, a string of characters encoded on a magnetic stripe, etc. In some cases, the second identifier may be similar and/or identical to the first identifier, although perhaps in a different form (as described below, for example). In other cases, the second identifier may be associated with and/or derived from the first identifier. (Merely by way of example, as noted above, the second identifier may comprise some or all of the first identifier, perhaps in an encrypted and/or encoded form.) One procedure for deriving a second identifier from a first identifier is described in detail above; others are possible as well. One skilled in the art will appreciate, based on the disclosure herein, that there are a variety of ways in which a second identifier may be derived (perhaps in a secure and/or non-repeatable way).

In yet other embodiments, the second identifier may not be derived from the first identifier but instead may be associated therewith (e.g., in a database maintained on the host 116 and/or the instrument-authority system 120) and/or both the first and second identifiers may be associated with the instrument, such that an association between the first and second identifiers may be verified at the terminal 108, host 116 and/or the instrument-authority system 120. As noted above, a particular set of embodiments, the second identifier may be provided in a different form than the first identifier (for example, the first identifier may be printed/embossed and/or stored on a magnetic stripe, while the second identifier may be represented by a bar code, perhaps with a numeric representation printed near the bar code).

Various procedures may be used to input/receive the second identifier, and the particular procedure used may depend on the nature of the second identifier. For instance, if both the first and second identifier are stored on a magnetic stripe on the instrument (e.g., if the first identifier and the second identifier are the same identifier, and/or if two separate identifiers are stored on one or more magnetic stripes), the instrument may be swiped again to input the second identifier. In other cases, a bar code scanner may be used to scan a bar code representing the second identifier. Alternatively and/or in addition, a clerk may use a keypad on the terminal 108 to input the second identifier.

In some embodiments, then, the second identifier may be transmitted to a host system 116 (block 232) and/or to an instrument-authority system 120 (block 236). The first and second identifiers may be correlated (block 240). Depending on the embodiment, this correlation procedure may occur at the point-of-sale terminal 108, the host system 116, the instrument-authority system 120, and/or any combination of these. In other embodiments, the correlation may take place at another location. Those skilled in the art will appreciate that the nature of the correlation procedure generally will depend on the relationship between the first and second identifiers.

Merely by way of example, if the second identifier is derived from the first identifier, the correlation procedure may comprise re-deriving a model second identifier (that is, a value that the second identifier should be equal to) from the first identifier (e.g., using the same or a similar process used to derive the second identifier and/or a process designed to produce a similar result), and comparing the model second identifier with the second identifier received at block 220. As another example, correlating the identifiers may comprise verifying that a second identifier is consistent with a first identifier. In other words, if the second identifier is derived from the first identifier, the system may decode and/or decrypt the second identifier and/or compare the result with the first identifier. For instance, if the second identifier comprises an encrypted portion of the first identifier (as described above, for example) the system may analyze the decrypted second identifier to ensure that it indeed comprises the expected portion of the first identifier.

Alternatively and/or additionally, if a model second identifier is associated (e.g., in a database) with the first identifier and/or with the instrument, the model second identifier may be looked up in the database, and/or the looked-up model identifier may be compared with the identifier received at block 220. (Of course, it may be the case that a model first identifier is derived from the second identifier and/or stored in a database, and in such cases, similar procedures may be used to compare the received first identifier with a model first identifier.) The procedure for correlating the first and second identifiers may be considered to be discretionary, so long as it is designed to ensure that one of the two identifiers can be used to verify the other identifier.

In a particular set of embodiments, the reception of the second identifier may serve to indicate that payment has been received (e.g., the point-of-sale terminal 108 will not accept the second identifier until payment has been received, and/or the clerk is instructed not to provide the second identifier until payment has been received). In some cases, the point-of-sale terminal 108 may be used to process the payment (such as, for instance, when the point-of-sale terminal 108 is used to process a credit/debit card payment, and/or when the point-of-sale terminal 108 also serves as a cash register, such that the clerk enters the amount of payment into the terminal 108 to finalize the sale transaction). In other cases, the clerk (and/or another) may indicate (for instance, through keypad input) that payment has been received. In a particular set of embodiments, for example, the clerk (and/or another) may input to the terminal 108 a second identifier associated with the instrument as confirmation that the instrument has been paid for. Hence the input of the second identifier may be used to confirm payment in a system designed to confirm payment before activating an instrument (such as the systems described in U.S. patent application Ser. No. 11/382,866, filed on a date even herewith by Jennings et al. and entitled "Security Systems for a Payment Instrument", the entire disclosure of which is incorporated herein by reference.

As noted above, in some embodiments, the terminal 108 may be configured to perform the correlation between the first and second identifiers. In such cases, the transmission of the second identifier (described above with respect to blocks 232 and 236) may simply comprise a confirmation that the correlation has been performed and that the first and second identifiers match. Similarly, if the host system 116 is configured to perform the correlation, the transmission described with respect to block 236 may be such a confirmation. Optionally, (e.g., in cases where the instrument-authority system 120 does not perform the correlation), the second identifier (and/or the confirmation, if appropriate) may be transmitted with the instrument information, e.g., to avoid excessive transmissions.

In a particular set of embodiments, transmitting the request to process a transaction (i.e., transmitting the instrument information) may itself serve as confirmation that the point-of-sale terminal 108 (and/or the host system 116) has successfully correlated the first identifier with the second identifier. That is, if the point-of sale terminal 108 is responsible for correlating the identifiers, it may not send any instrument information (or, alternatively, any request to process a transaction) until the correlation has been performed. By the same token, if the host system 116 is responsible for performing the correlation, it may not pass the instrument information (and/or request to process the transaction) to the instrument-authority system 120 until the correlation has been successfully performed.

At block 244, the successful correlation of the first and second identifiers may be reported to the host system 116, point-of-sale terminal 108 and/or customer 104. After the successful correlation of the identifiers, the transaction may be processed (block 248) at the instrument-authority system 120, host system 116, and/or nay other appropriate device(s). In some cases, such as an instrument purchase and/or reload transaction, the transaction may comprise authenticating the instrument by validating the received identifier as corresponding to a previously unauthenticated instrument, or alternatively by validating the received identifier as corresponding to a valid, previously authenticated instrument. The authentication may also comprise creating an account associated with the instrument, and/or crediting that account with an amount of funds associated with the instrument (e.g., the amount of funds to be loaded or reloaded). In an instrument purchase transaction, this amount may be pre-determined and/or based on a value paid for the instrument (which may, as noted above, be communicated by the point-of-sale terminal 108 to the instrument-authority system).

It is noted that, in some cases the authentication may not result in full activation of an unrestricted instrument. Merely by way of example, commonly-owned, co-pending provisional U.S. patent application Ser. No. 11/382,866, filed on a date even herewith by Jennings et al. and entitled "Security Systems for a Payment Instrument", already incorporated by reference, describes how the account may be placed in a "frozen" and/or locked state during the authentication process. In other embodiments, however, the authentication may result in full activation of the instrument and/or any funds associated therewith. In some cases, therefore, the receipt of the second identifier may indicate that the system should activate the instrument (and/or an account associated with the instrument). In a set of embodiments, this activation enables the use of the instrument, such that the instrument and/or account is unfrozen and/or placed in an active state, and the instrument can be used for purchases, cash withdrawals, money transfers, etc.

In other cases, processing the transaction may involve other operations, which are known in the art and need not be described in detail herein. Merely by way of example, if the transaction is a redemption transaction, processing the transaction may comprise approving the transaction and/or debiting an account associated with the instrument in the amount of the transaction. Other transactions, including without limitation those described above, may be processed in the appropriate manner. Optionally, the instrument-authority system 120 may provide a confirmation to the point-of-sale terminal 108 (e.g., via the host 116) that the transaction has been processed (block 248).

Depending on the nature of the transaction(s) to be processed, the point-of-sale terminal 108 may additionally be employed to capture information needed also to complete the remainder of the transaction. Accordingly, the point-of-sale terminal 108 may include or be in communication with associated equipment or devices used for capturing such information, such as bar-code information identifying an item that forms part of the full transaction. Furthermore, the point-of-sale terminal 108 may include other components that facilitate execution of a transaction, such as payment-information-entry components, signature-capture components, keypads, keyboards, display screens, biometric-data-capture components, speakers, printers, processors, software, memory, communication devices, and the like. Examples of suitable point-of-sale devices that include multiple capabilities are provided in the following commonly assigned applications, the entire disclosures of which are incorporated herein by reference for all purposes: U.S. Prov. Pat. Appl. No. 60/147,889, entitled "INTEGRATED POINT-OF-SALE DEVICE," filed Aug. 9, 1999 by Randy J. Templeton et al.; U.S. patent application Ser. No. 09/634,901, entitled "POINT-OF-SALE PAYMENT SYSTEM," filed Aug. 9, 2000 by Randy J. Templeton et al.; U.S. patent application Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg.

Figure 3:
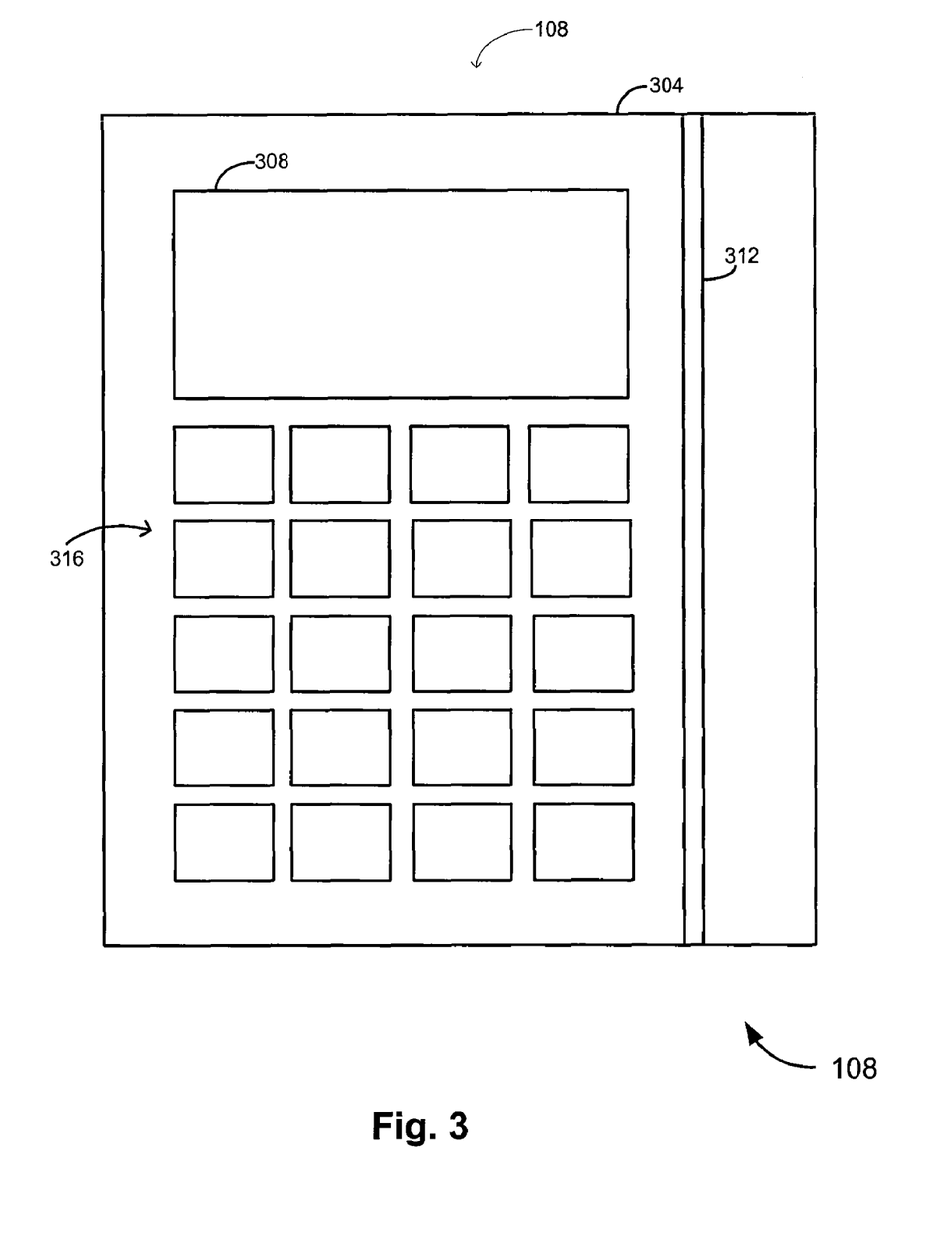
FIG. 3 is a schematic diagram of a point-of-sale terminal that may be used with the system of FIG. 1A.

One specific example of how a point-of-sale terminal 108 may be constructed is illustrated in FIG. 3. In this embodiment, the point-of-sale terminal 108 comprises a housing 304 having a keypad 316 for entering various types of information. The keys of the keypad 316 may permit the entry of numbers or letters, or may be function keys for performing various predefined functions. The terminal 108 further includes a display screen 308 for displaying information relating to a transaction. A card reader 312 is also provided for reading information from cards, such as from a magnetic stripe included on instruments that have the form of cards. The card reader 312 may thus read payment information, identification information, and the like from encoding on the cards. In some instances, the point-of-sale terminal 108 may be connected to an attached printer, such as an FDX-400 printer available from AXIOHM.

Figure 4:
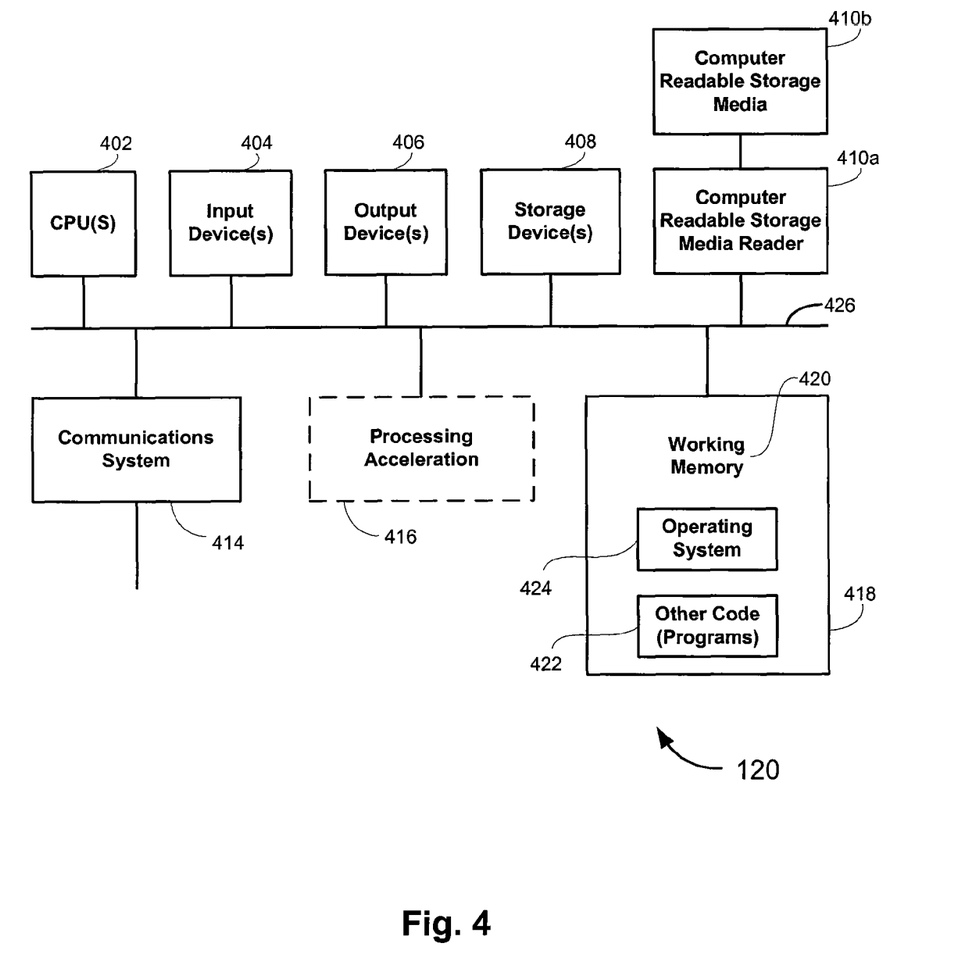
FIG. 4 is a schematic illustration of a computer system on which methods of the invention may be embodied.

FIG. 4 provides a schematic illustration of a structure that may be used to implement the instrument-authority system 120; a similar structure may be used for implementation of the host system. FIG. 4 broadly illustrates how individual system elements may be implemented in a separated or more integrated manner. The instrument-authority system 120 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the host system 116, point-of-sale terminals 108, as described in connection with FIGS. 1A, 1B, and 2.

The instrument-authority system 12 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

It should be noted that the methods, systems and devices discussed above are intended merely to be exemplary in nature. Consequently, various embodiments may omit, substitute and/or add various procedures and/or components as appropriate. For instance, it should be appreciated that in alternative embodiments, the methods may be performed in an order different than that described. Merely by way of example, in the method described with respect to FIG. 2, the instrument information is transmitted before the second identifier is received. As noted above some cases, the second identifier may be received before transmitting anything to the host system/instrument-authority system, and/or the second identifier may be transmitted as part of the instrument information. In other cases, also as noted above, the correlation may be performed at the point-of-sale terminal, perhaps before any instrument information is transmitted, and/or the instrument information may include a confirmation that the first identifier correlates with the second identifier. Based on the disclosure herein, one skilled in the art will appreciate that a wide variation in the order of described activities may be accommodated by embodiments of the invention.

It should also be appreciated that the methods described above may be performed by hardware components and/or software programs, and thus may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as an point-of-sale terminal, host system and/or instrument-authority system). Alternatively, the methods may be performed by a combination of hardware and software.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for processing at a point-of-sale device a transaction involving a stored-value instrument, the point-of-sale device comprising a processor and machine-readable medium, the method comprising:
   receiving at a point-of-sale device a first identifier identifying a stored-value instrument, wherein the first identifier is physically stored on the stored-value instrument;
   receiving at the point-of-sale device a second identifier associated with the stored-value instrument, wherein the second identifier is physically stored on the stored value instrument, and wherein the second identifier comprises at least a portion of the first identifier;
   transmitting from the point-of-sale device a request to process a transaction involving the stored-value instrument, wherein both the first and the second identifiers are transmitted from the point-of-sale device, and wherein the first and second identifiers are transmitted to an instrument-authority system to process the transaction; and
   correlating the first identifier with the second identifier by analyzing the second identifier to determine if it comprises at least a portion of the first identifier;
   the point-of-sale device receiving a confirmation from the instrument authority system that the transaction has been processed, the transaction having been processed in response to the correlation between the first identifier with the second identifier.

2. A method as recited in claim 1, wherein the second identifier is derived from at least a portion of the first identifier using a particular procedure.

3. A method as recited in claim 2, wherein correlating the first identifier with the second identifier comprises:
   deriving a model identifier from the first identifier using the particular procedure; and
   comparing the model identifier with the second identifier.

4. A method as recited in claim 2, wherein the second identifier is encrypted.

5. A method as recited in claim 1, wherein correlating the first identifier with the second identifier comprises:
   searching a database for a record associated with the first identifier;
   obtaining from the record a model identifier; and
   comparing the model identifier with the second identifier.

6. A method as recited in claim 1, wherein correlating the first identifier with the second identifier comprises:
   transmitting the first identifier and the second identifier at a host system; and
   the host system correlating the first identifier with the second identifier.

7. A method as recited in claim 1, wherein correlating the first identifier with the second identifier comprises:
   receiving the first identifier and the second identifier at an instrument authority system; and
   the instrument-authority system correlating the first identifier with the second identifier.

8. A method as recited in claim 1, wherein correlating the first identifier with the second identifier comprises the point-of-sale device correlating the first identifier with the second identifier.

9. A method as recited in claim 1, wherein the stored-value instrument comprises a stored-value card, and wherein the first identifier is a card number associated with the stored-value instrument.

10. A method as recited in claim 1, wherein the stored-value instrument comprises a magnetic stripe, wherein the identifier is encoded on the magnetic stripe, and wherein receiving the identifier comprises a clerk swiping the magnetic stripe through a magnetic stripe reader.

11. A method as recited in claim 10, wherein the second identifier is represented by a bar code on the stored-value instrument, and wherein receiving the second identifier comprises scanning the bar code.

12. A method as recited in claim 1, wherein receiving the second identifier comprises receiving input from the clerk, the input comprising the second identifier.

13. A method as recited in claim 12, wherein the second identifier is printed on the stored-value instrument.

14. A method as recited in claim 1, wherein the first identifier and the second identifier are the same identifier.

15. A method as recited in claim 1, wherein the stored-value instrument comprises a first storage device selected from the group consisting of a magnetic stripe, a radiofrequency identification ("RFID") tag, a memory chip and a printed number, and wherein the first identifier is stored on the first storage device.

16. A method as recited in claim 15, wherein the stored-value instrument comprises a second storage device selected from the group consisting of a magnetic stripe, a radio-frequency identification ("RFID") tag, a memory chip and a printed number, and wherein the first identifier is stored on the first storage device.

17. A method as recited iii claim 16, wherein the first storage device and the second storage device are not the same storage device.

18. A method as recited in claim 1, wherein receiving the second identifier indicates that a payment associated with the stored-value instrument has been tendered.

19. A method as recited in claim 1, further comprising:
receiving at the point-of-sale device a confirmation that the first and second identifiers have been correlated.

20. A system for processing a transaction involving a stored-value instrument, the system comprising:
a point-of-sale device configured to:
receive a first identifier identifying a stored-value instrument, wherein the first identifier is stored on the stored-value instrument;
receive a second identifier associated with the stored-value instrument, wherein the second identifier is stored on the stored-value instrument and comprises at least a portion of the first identifier;
transmit a request to process a transaction involving the stored-value instrument; and
an instrument-authority system in communication with the point-of-sale device, the instrument-authority system comprising:
a communications system in communication with the point-of-sale device;
a processor in communication with the communications system; and
a memory coupled with the processor, the memory comprising a computer-readable storage medium having a computer-readable program embodied therein for directing operation of the instrument-authority system, the computer-readable program including:
instructions for receiving the first identifier from the point-of-sale device;
instructions for receiving the second identifier from the point-of-sale device;
instructions for correlating the first identifier with the second identifier by analyzing the second identifier to determine if it comprises a portion of the first identifier; and
instructions for processing the transaction.

21. A point-of-sale device for processing a transaction involving a stored-value instrument, the point-of-sale device comprising:
a communications system;
a processor in communication with the communications system; and
a memory coupled with the processor, the memory comprising a computer readable storage medium having a computer-readable program embodied therein for directing operation of the instrument-authority system, the computer-readable program including:
receive a first identifier identifying a stored-value instrument, wherein the first identifier is stored on the stored-value instrument;
receive a second identifier associated with the stored-value instrument, wherein the second identifier is stored on the stored-value instrument and comprise at least a portion of the first identifier;
correlate the first identifier with the second identifier by analyzing the second identifier to determine if it comprises a portion of the first identifier;
transmit a request to process a transaction involving the stored-value instrument; and
transmit a confirmation that the first identifier correlates with the second identifier; and
receive a confirmation that the transaction has been processed.

22. A system as recited in claim 21, wherein the request to process the transaction serves as the confirmation that the first identifier correlates with the second identifier.

23. A system for processing a transaction involving a stored-value instrument, the system comprising:
a communications system;
a processor in communication with the communications system; and
a memory coupled with the processor, the memory comprising a computer-readable storage medium having a computer-readable program embodied therein for directing operation of the system, the computer-readable program including:
instructions for receiving a request from a point-of-sale device to process a transaction involving a stored-value instrument, wherein the stored-value-instrument comprises an instrument body having a first storage device for storing a first identifier and a second storage device for storing a second identifier;
instructions for receiving the first identifier identifying the stored-value instrument, wherein the first identifier is stored on the first storage device;
instructions for receiving a second identifier, wherein the second identifier is associated with the stored-value instrument, and wherein the second identifier is stored on the second storage device and comprises at least a portion of the first identifier;
instructions for correlating the first identifier with the second identifier; analyzing the second identifier to determine if it comprises a portion of the first identifier;
bused on the correlation of the first identifier with the second identifier, instructions for processing the transaction; and
instructions for providing a confirmation that the transaction has been processed.

24. A system as recited in claim 23, wherein the first storage device is selected from the group consisting of a magnetic stripe, a radio-frequency identification ("RFID") tag, a memory chip and a printed number.

25. A system as recited in claim 23, wherein the second storage device is selected from the group consisting of a magnetic stripe, a radio-frequency identification ("RFID") tag, a memory chip and a printed number.

26. A software program embodied on at least one computer readable medium, the software program comprising instructions executable by one or more computers to:
receive a request from a point-of-sale device to process a transaction involving a stored-value instrument;
receive a first identifier identifying the stored-value instrument, wherein the first identifier is stored on the stored-value instrument;
receive a second identifier associated with the stored-value instrument, wherein the second identifier is stored on the stored-value instrument and comprises at least a portion of the first identifier;
correlate the first identifier with the second identifier by analyzing the second identifier to determine if it comprises a portion of the first identifier;
based on the correlation of the first identifier with the second identifier, process the transaction; and
provide a confirmation that the transaction has been processed.

* * * * *